United States Patent [19]

Remboski, Jr.

[11] Patent Number: 4,891,970

[45] Date of Patent: Jan. 9, 1990

[54] LUMINOSITY DETECTOR FOR INTERNAL COMBUSTION ENGINE, METHOD OF OPERATING ENGINE AND METHOD OF SENSING TEMPERATURE

[75] Inventor: Donald J. Remboski, Jr., Northborough, Mass.

[73] Assignee: Barrack Technology Limited, Marlborough, Mass.

[21] Appl. No.: 280,595

[22] Filed: Dec. 6, 1988

[51] Int. Cl.[4] ........................... G01M 15/00
[52] U.S. Cl. ............................ 73/116; 374/144
[58] Field of Search ............ 73/116, 117.3, 35; 123/421, 477; 250/370.15; 356/437; 374/144

[56] References Cited

U.S. PATENT DOCUMENTS 3,978,720  9/1976  Ford .......................... 73/116
4,452,072  6/1984  Damson et al. ................ 73/116

Primary Examiner—Jerry W. Myracle
Attorney, Agent, or Firm—Harness, Dickey & Pierce

[57] ABSTRACT

A luminosity and temperature detector for an internal combustion engine and method for measuring luminosity including a light probe and photodiode that receives the light transmitted from the light probe. The photodiode is designed, constructed and biased to operate within the zero temperature coefficient portion of its range for the wavelengths being measured. In addition, the dark current is measured when there is no luminosity due to combustion and this is subtracted from the other readings to obtain temperature compensation. Furthermore, the dark current measurement will indicate the temperature of the photodiode.

7 Claims, 1 Drawing Sheet

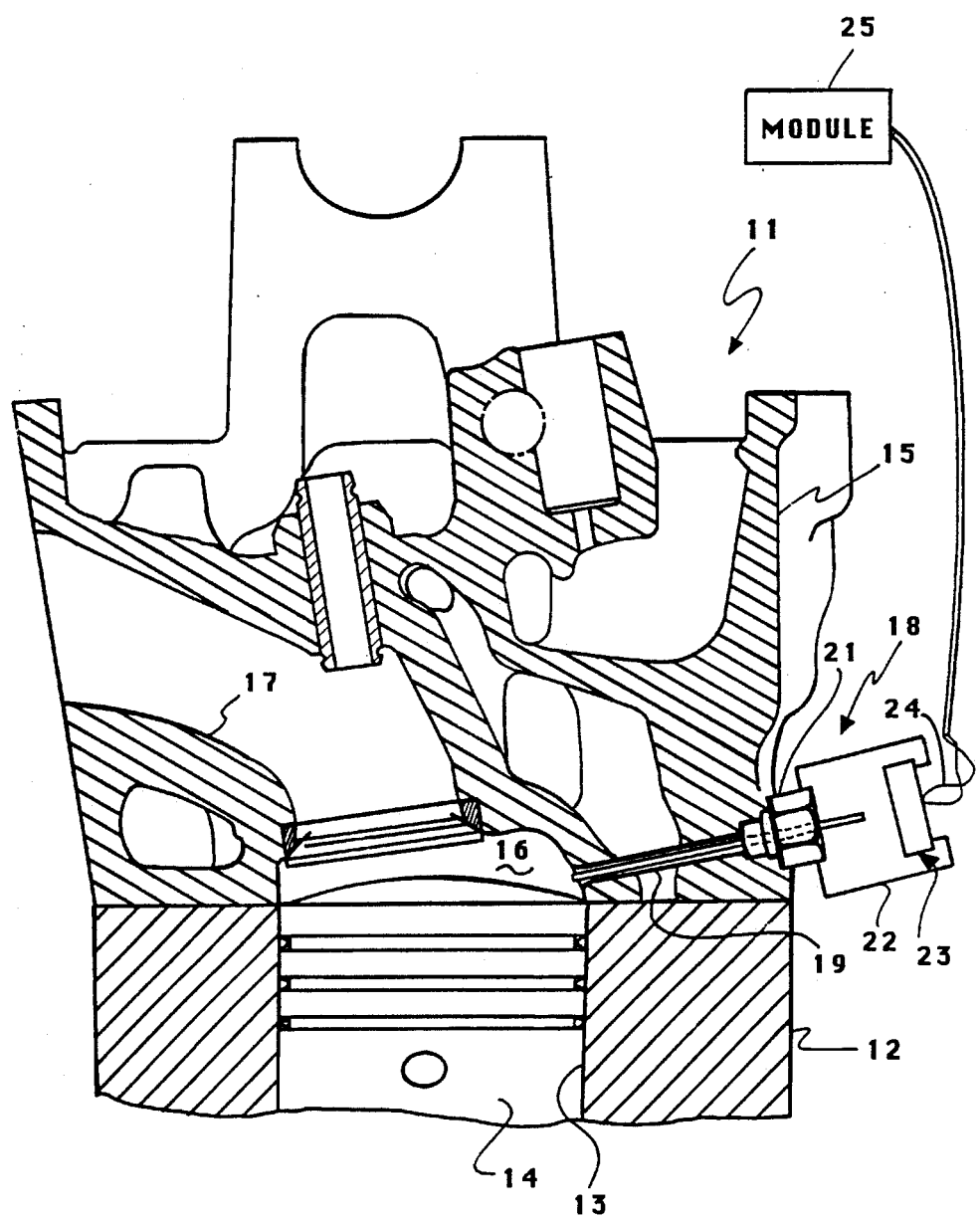

LUMINOSITY DETECTOR FOR INTERNAL COMBUSTION ENGINE, METHOD OF OPERATING ENGINE AND METHOD OF SENSING TEMPERATURE

BACKGROUND OF THE INVENTION

This invention relates to a luminosity detector for an internal combustion engine, a method for operating an internal combustion engine and an improved method for measuring the temperature of a component of an internal combustion engine.

Efforts have been made to analyze the combustion process occurring within the combustion chamber of an internal combustion engine through the use of luminosity detectors. Such detectors normally employ some form of window or probe that will transmit light from the combustion chamber to a photodiode that outputs an electrical signal that is related to the luminosity within the combustion chamber. Although this type of device has been utilized for certain experimental purposes and also for detecting such abnormal running conditions as knock in an engine, it has been found that this signal can be utilized to measure and control a number of engine operating parameters. Applications of this principle are disclosed in the copending applications entitled "Method of Operating an Engine", Ser. No. 193,918, filed May 13, 1988 and its continuation in part application entitled "Method of Operating An Engine And Measuring Certain Operating Parameters", Ser. No. 266,682, filed Nov. 3, 1988, each filed in the name of Steven L. Plee, et al. These disclosures are incorporated herein by reference.

As noted in the aforenoted copending applications, the use of a luminosity detector can present a very significant tool in not only engine measurement but also engine control. The various types of controls possible and measurements which may be made are disclosed in those applications and need not be repeated here.

In applications of luminosity detectors to detect the conditions in a combustion chamber, there are a number of problems which may arise. Specifically, the luminosity detector employs a photodiode which is normally mounted in or adjacent to the cylinder head. As is well known, the responsivity (sensitivity to light) and dark current, sometimes called reverse saturation current, (output of the device in a no-light condition) change with temperature.

As is well known, the components of an engine undergo considerable temperature variations during the engine operation. Since the combustion chamber is normally formed in the cylinder head and the luminosity detector is mounted there, it is positioned in a place where the maximum or near maximum temperature variations may exist. For example, under extreme cold start conditions the sensor may be exposed to a temperature as low as $-30°$ F. On the other hand, after hot soak, the sensor may get as hot as 300° F. Of course, these temperature variations and their effect on the responsivity and dark current, as aforenoted, can present problems in connection with the use of these devices to either measure or control an engine.

It is therefore, a principal object of this invention to provide an improved arrangement for measuring the luminosity in an internal combustion engine by means of a luminosity detector.

It is a further object of this invention to provide an improved method for controlling an engine using a luminosity detector wherein temperature compensation is not required.

It is a further object of this invention to provide a self temperature compensated luminosity detector for an internal combustion engine for measurement and control purposes.

As has been previously noted, the dark current of a photodiode varies with the engine temperature. It is, therefore, another object of this invention to provide an improved arrangement for compensating for the changes in luminosity detector sensitivity by providing temperature compensation.

It is a further object of this invention to provide an improved method for measuring engine operating parameters and controlling the engine using a luminosity detector that will compensate for temperature variations.

In view of the fact that the dark current of a photodiode varies with temperature, it has been discovered that the photodiode can be utilized for other purposes in addition to luminosity measurement. For example, by placing the photodiode in heat exchanging relationship with a component of the engine, the temperature of the engine component can be measured by sensing the dark current of the photodiode.

It is, therefore, a still futher object of this invention to provide an improved and simplified arrangement for measuring the temperature of an engine component.

SUMMARY OF THE INVENTION

A first feature of this invention is adapted to be embodied in a luminosity detector for an internal combustion engine having a combustion chamber. A light probe is provided in the combustion chamber for transmitting light from the combustion chamber through a body of the engine that defines at least in part the combustion chamber to a photodiode that is fixed relative to that body. The photodiode generates an electrical signal for transmission to an electrical module for producing engine operating data. In accordance with this feature of the invention, the photodiode is manufactured and biased to operate within the range of zero temperature coefficient for the wavelength being measured by the detector.

Another feature of the invention is adapted to be embodied in a method for measuring the luminosity within a combustion chamber by means of a light probe and diode as described in the preceding paragraph. In accordance with this feature of the invention, the output of the photodiode is measured at times when there is no luminosity within the combustion chamber and this reading is subtracted from all other readings made during the time when there is luminosity within the combustion chamber to provide a temperature compensated result.

A still further object of this invention is adapted to be embodied in a method for measuring engine temperature incorporating a luminosity detector for an engine that is comprised of a light probe in the combustion chamber for transmitting light from the combustion chamber to a photodiode through a body of the engine that defines the combustion chamber. The photodiode is mounted in heat exchanging relationship to the body and the output of the photodiode is measured when there is no luminosity within the combustion chamber. The measured value is then compared with the temperature coefficient characteristics of the diode for dark current to provide an output signal indicative of the temperature.

BRIEF DESCRIPTION OF THE DRAWING

The single sheet of drawings in a cross-sectional view taken through a cylinder of an internal combustion engine including a luminosity detector constructed and operated in accordance with an embodiment of the invention.

DETAILED DESCRIPTION OF THE PREFERRED EMBODIMENT

Referring to the single feature of drawings, a multiple cylinder internal combustion engine is identified generally by the reference numeral 11. It is to be understood that, although the invention has particular utility in multiple cylinder engines, certain facets of the invention may find application in single cylinder engines. Also, although the invention is described in conjunction with a reciprocating type engine, the principles of the invention may be utilized with engines of non-reciprocating type, such as rotary, and with engines operating on either two stroke or four stroke cycles. Certain facets of the invention may also be utilized in other arrangements when luminosity is being detected or, as will become apparent, where temperature is to be measured.

Inasmuch as the invention is directed primarily with the combustion chamber and the conditions therein, only a cross-sectional view taken through one of the combustion chambers is believed to be necessary to understand the invention. This cross-sectional view shows a cylinder block 12 having a cylinder bore 13 in which a piston 14 is supported for reciprocation. The piston 14 is connected by means of a connecting rod (not shown) to a crankshaft for providing output power from the engine.

A cylinder head 15 is fixed in a known manner to the cylinder block 12 and has a recess 16 which cooperates with the cylinder bore 13 and the head of the piston 14 to provide a chamber of variable volume, sometimes referred to hereinafter as the combustion chamber.

An intake port 17 and an exhaust port (not shown) extend through the cylinder head 5 and have their communication with the combustion chamber 16 controlled by poppet type intake and exhaust valves (not shown) for admitting a charge to the combustion chamber 15 and for discharging the burnt charge for the combustion chamber.

The charge admitted to the combustion 16 may comprise pure air or a fuel/air mixture that is formed by a suitable charge former such as a port or throttle body type fuel injector or carburetor. Alternatively, if pure air is injected, direct cylinder injection may be employed for injecting fuel into the combustion chamber 16 to form the fuel/air mixture. The fuel/air ratio may be controlled in any of a wide variety of known manners such as be means of throttle valves, fuel control valves, injection duration, injection timing, et cetera.

The engine 11 may be of the diesel or spark type but the types of controls exercised and the nature of luminosity sensing may vary with the engine type. The following discussion is concerned primarily with a spark ignited engine. If the engine 11 is of the diesel type, combustion is initiated through timing of the direct cylinder fuel injection or in any of the other known manner normally employed in connection with diesel engines. If, on the other hand, the engine 11 is of the spark ignited type, a spark plug will be carried in the cylinder heads 15 and have its gap exposed in the combustion chamber 16. The spark timing is controlled by a suitable mechanism which may be of any conventional type; however, the timing of the spark firing can be varied in accordance with parameters described in the aforenoted copending patent applications.

As has been previously noted, the invention is capable of embodiment in any of a wide variety of conventional type of internal combustion engines and, for that reason, the details of the engine construction are not necessary to understand how the invention can be practiced by those skilled in the art. However, in accordance with the invention there is provided in the combustion chamber 16 a luminoisty detector, indicated generally by the reference numeral 18. The luminosity detector 18 includes a fiber optic probe 19 or other types of optical access which extends through the cylinder head 15 and has its end terminating at the combustion chamber 16.

The fiber optic probe 19 is held in place by means of a compression fitting and has its outer end disposed within a light sealed housing 22 in proximity to a detector 23. It has been found that the type of detector 23 which is employed will depend to some extent on the parameters to be measured. Specifically, the type of detector will depend to a large extent upon the gas or gases whose emission is to be measured within the cylinder.

A wide variety of emissions from the flowing gases in the chamber can be measured and specifically those which have been found to be of particular importance are OH emissions, CH emissions, $C_2$ emissions and/or $H_2O$ emissions. The type of detector employed for the specific emissions will vary. However, if working primarily with $H_2O$ emissions, there is a stronger signal and it is possible to employ a less expensive detector such as a silicon photo detector.

Also it may be desirable to provide a monochromator or an optical filter in front of the detector so as to select the desired wavelength of light which is being measured. The detector 23 outputs a voltage signal through a conductor 24 to a remotely positioned module 25. It is to be understood that the detector 23 is utilized in conjunction with a generally known type of detecting circuit that includes a biasing voltage which is applied to the detector 23.

As is well known, the output signal of a photodiode will depend on a number of factors in addition to of the amount of light falling on it. For example, the electrical output of the photodiode or detector 23 will depend to a large extent upon its temperature. Since the detector 23 is mounted on the cylinder head 15, large temperature variations can be expected. As has been previously noted, the detector 23 may operate at as low a temperature as $-30°$ F. during cold cranking. On the other hand, after hot soak periods, the temperature of the detector 23 may be as high as $300°$ F. Such wide temperature variations can give rise to significant differences in output signal and, in accordance with a feature of the invention, an arrangement is provided for not only limiting the variation in response to temperature variations but also for compensating for them. In fact, as will described, the detector 23 can be utilized to sense cylinder head temperature.

In conjunction with the wavelengths to be measured and particularly those associated specifically with $H_2O$ emissions, it is possible to employ a silicon photodiode. As is well known, the temperature coefficient of the detector varies and at shorter wavelengths the temperature coefficient tends to be negative. At longer wavelengths the temperature coefficient tends to be positive. However, in wavelengths at the middle of the detector's useful range, the temperature coefficient is near zero and, therefore, it is desirable to employ a detector that will have such zero temperature coefficients in the wavelengths being measured. In addition, the temperature coefficients of the photodiode can be changed during the manufacturing process and the manufacturing process should be such that the photodiode operates in the zero temperature coefficient range. Furthermore, the bias voltage at which the diode is operated also will effect the temperature coefficient and the bias should also be chosen so as to operate the diode or detector 23 in the zero temperature coefficient range.

Therefore, by appropriately selecting the material for the photodiode 23 to relate to the wavelengths being measured, by adjusting its bias and by changing its manufacturing technique within permissible ranges, it is possible to operate the device without requiring temperature compensation.

Even though the detector 23 is operated primarily in its zero temperature coefficient range, there are conditions wherein the device is utilized to operate outside of this range. For example, the dark current of the detector, the output during the time when there is no luminosity from combustion, does vary with temperature. However, by taking a measurement of the dark current at the time when there is no luminosity from combustion and subtracting this value from all readings made during the time when there is combustion, changes for dark current with temperature can be compensated for. A simple summing circuit in the module 25 can be utilized to achieve this compensation. Preferably, a measurement of dark current can be made once per operating cycle so as to make this adjustment.

The fact that the dark current also varies with temperature means that the detector 23 can, in addition to providing a luminosity signal, provide a temperature signal. The way this can be done is by placing the detector 23 in heat exchanging relationship with the cylinder head 15 and then the dark current can be measured when there is no luminosity from combustion, as aforedescribed. The module 25 can then be programmed in conjunction with the temperature coefficients of the detector 23 under dark current conditions to provide an output signal indicative of temperature.

If the photodiode is used in a region of non-zero responsivity temperature coefficient, the diode temperature can be measured in the same manner as cylinder head temperature is measured and the module 25 can be programmed to provide temperature compensation. However, it is preferred to operate the device as aforenoted within its zero temperature coefficient range.

As has been previously noted, the measured outputs can be utilized to provide desired information or control the engine in the manners described in the aforenoted copending patent applications of the Assignee. In view of this, further description of the control parameters and control systems need not be described.

It should be readily apparent from the foregoing description that a very effective luminosity detector and means for measuring engine temperature simultaneously has been disclosed. Although an embodiment of the invention is disclosed. Various changes and modifications may be made without departing from the spirit and scope of the invention, as defined by the appended claims.

I claim:

1. In a luminosity detector for an internal combustion engine having a combustion chamber, light probe means in said combustion chamber for transmitting light from said combustion chamber through a body of said engine defining at least in part said combustion chamber, a photodiode fixed relative to said body and in light receiving relationship to said light probe to receive light therefrom and generate an electrical signal for transmission to an electrical module for providing engine operating data, the improvement comprising said photodiode being manufactured and biased to operate within the range of zero temperature coefficient for the wavelength being measured by said detector.

2. In a luminosity detector as set forth in claim 1 in combination with a measuring circuit including means for measuring the output of the photodetector at a time when there is no luminosity within the combustion chamber due to combustion and subtracting that measured value from subsequently measured values taken when there is luminosity during the combustion within the combustion chamber for providing a temperature compensated signal.

3. In a luminosity detector as set forth in claim 1 further including means for measuring the output of the photodiode at a time when there is no luminosity due to combustion in the combustion chamber and obtaining a temperature signal from the output in relation to the temperature characteristics of the photodiode.

4. In a luminosity detector as set forth in claim 3 in combination with a measuring circuit including means for measuring the output of the photodetector at a time when there is no luminosity within the combustion chamber due to combustion and subtracting that measured value from subsequently measured values taken when there is luminosity during the combustion within the combustion chamber for providing a temperature compensated signal.

5. The method of providing a luminosity signal from an internal combustion engine having a combustion chamber, light probe means in said combustion chamber for transmitting light from said combustion chamber through a body of said engine defining at least in part said combustion chamber, a photodiode fixed relative to said body and in light receiving relation to said light probe to receive light transmitted therefrom and generate an electrical signal for transmission to an electrical module for producing engine operating data comprising the steps of measuring the electrical signal generated by the photodiode at a time when there is no luminosity in the combustion chamber due to combustion, measuring the luminosity in the combustion chamber during the time when there is combustion and subtracting the first measured signal from the second measured signal to provide a signal indicative of luminosity and compensated for temperature.

6. The method of providing a luminosity signal as set forth in claim 5 further including the step of providing a temperature measurement by comparing the first measured signal with the temperature characteristics of the photodiode.

7. The method of measuring the temperature of a body of an internal combustion engine having a combustion chamber, light probe means in said combustion chamber for transmitting light from said combustion chamber through said body, a photodiode fixed relative to said body and in heat exchanging relationship and in light receiving relationship from said light probe to receive light therefrom and generate an electrical signal for transmission to an electrical module for producing engine operating data comprising the steps of measuring the output of the photodiode at a time when there is no luminosity within the combustion chamber due to combustion and determining the temperature from the dark current temperature characteristics of the photodiode.

* * * * *